United States Patent [19]

Mattor

[11] 4,311,766
[45] Jan. 19, 1982

[54] RELEASE COATINGS
[75] Inventor: John A. Mattor, Bar Mills, Me.
[73] Assignee: Scott Paper Company, Philadelphia, Pa.
[21] Appl. No.: 193,193
[22] Filed: Oct. 2, 1980

Related U.S. Application Data

[63] Continuation-in-part of Ser. No. 78,411, Sep. 24, 1979.

[51] Int. Cl.³ .............................................. B05D 3/06
[52] U.S. Cl. .................................. 428/514; 156/232; 156/239; 156/247; 264/213; 264/214; 427/44; 427/147; 428/520
[58] Field of Search ............... 156/239, 245, 246, 247, 156/231, 232; 427/44, 54.1, 147; 264/213, 214; 428/514, 520

[56] References Cited

U.S. PATENT DOCUMENTS

| | | | |
|---|---|---|---|
| 3,793,102 | 2/1974 | Day | 156/247 |
| 3,929,545 | 5/1975 | Van Dyck et al. | 156/247 |
| 4,016,333 | 4/1977 | Gaske et al. | 427/44 |
| 4,030,955 | 6/1977 | Antonio et al. | 156/235 |
| 4,041,200 | 8/1977 | Boranian et al. | 156/247 |
| 4,138,508 | 2/1979 | Spatz et al. | 427/54.1 |
| 4,201,808 | 5/1980 | Cully | 428/40 |

FOREIGN PATENT DOCUMENTS

| | | |
|---|---|---|
| 9885 | 4/1980 | European Pat. Off. |
| 1519493 | 7/1978 | United Kingdom |
| 2019257 | 10/1979 | United Kingdom |

*Primary Examiner*—John H. Newsome
*Attorney, Agent, or Firm*—R. Duke Vickrey; John W. Kane, Jr.; Francis M. DiBiase

[57] ABSTRACT

Disclosed is a release coating provided by a coating composition having an acrylic functional component which has been polymerized by electron beam radiation. In a preferred embodiment the coating composition does not contain polysiloxane. In another preferred embodiment some of the acrylic functional component has one acrylic group per molecule and some has three or more acrylic groups per molecule before polymerization.

18 Claims, No Drawings

RELEASE COATINGS

RELATED APPLICATION

This application is a Continuation-in-Part of U.S. Ser. No. 78,411, filed Sept. 24, 1979.

TECHNICAL FIELD

The present invention relates to coatings for paper and other sheet-like substrates, and particularly to release coatings which are characterized by their ability to separate intact from a surface which is normally adherent.

BACKGROUND ART

A number of processes exist in which a plastic sheet or film is formed on or against a release sheet and then separated from the release sheet after taking steps, such as cooling or curing, to set the sheet or film. Curing, where necessary, may be accomplished by heat, by peroxide catalyst, or U.V. radiation or by electron beam radiation. The release sheet provides a surface from which the set plastic material can be readily separated and imparts to the surface of the plastic material the quality of finish of the release surface. For example, a desired textured surface can be provided on the surface of the plastic material by forming on or against a release sheet having the reverse surface effect of the desired textured surface.

One example of such forming processes is "casting", wherein a resinous material, such as polyvinyl chloride or polyurethane resin, in a flowable state is deposited or "cast" onto the release sheet surface, heated, cured and cooled to consolidate the resinous material into a continuous self-supporting film, and stripped from the support. The release sheet is normally provided with a desired surface effect, such as high gloss, texturing or an embossed configuration, and the reverse of the surface effect is replicated on the cast film.

Another example of such forming processes is "panel pressing" of decorative plastic laminates, which can be either of the high pressure or low pressure type. In high pressure panel pressing, decorative laminates are conventionally prepared by assembling in a stacked relationship a plurality of core sheets, each of which is a web of paper impregnated with a resinous material, such as phenolic resin. Immediately positioned above the core sheet assembly is a decorative sheet, which is a resin saturated sheet having a solid color or a suitable design thereon. Superimposed above the decorative sheet is generally an overlay sheet which is a thin sheet of fine paper impregnated with a noble thermosetting resin, such as a melamine formaldehyde resin or an unsaturated polyester resin and the like (and is generally the same resin used to impregnate the decorative sheet). The entire assembly of core sheets, decorative sheet, and overlay sheet is placed between platens in a press and consolidated by application of heat and pressure. Generally, a release sheet having the desired surface effect to be reproduced in reverse in the surface of the overlay sheet is placed against the overlay sheet during pressing. High pressure laminates after being consolidated are usually further glued to a structural substrate, such as particle board or plywood. Low pressure panel pressed decorative laminates are made in a similar manner to high pressure laminates, but generally involve lamination of the decorative sheet directly to particle board or other structural substrate.

Other pressing processes where a plastic sheet or film is formed on or against a release sheet may not include the lamination step, but only texturing a moldable plastic surface which is already laminated. For example, a plastic film could be coated directly onto particle board or plywood and then textured by pressing against a release sheet having the desired textured pattern in its surface while setting the plastic film. (See, for example, U.S. Pat. No. 4,113,894 to Koch.)

Other uses for release sheets include heat transferable printed designs, pressure sensitive adhesive coated webs, and interleavers for panel pressing. The transferable printed designs are printed on the release sheet with a polyvinyl chloride plastisol ink or offset printing ink and overcoated with a polyvinyl chloride plastisol. When placed against a receptive surface, such as a T-shirt, and heated, the printed design and overlayer are transferred to the receptive surface where it sets upon cooling. In this application, the release surface must be capable of being printed upon and capable of releasing the printed material and overlying layer of polyvinyl chloride plastisol when it is transferred.

On the other hand, pressure sensitive coated webs are typically adhesive coated tapes, labels or decals and the like which are attached to a release surface for easy removal later when it is desired to permanently attach them to an object. The release surface must permit temporary attachment of the pressure sensitive adhesive, but also permit easy removal. The pressure sensitive adhesive laminates can be formed by coating a film of the adhesive onto the release surface and then attaching the backing sheet (i.e., tape), or the adhesive can be first coated on the backing sheet and then laminated to the release sheet.

An interleaver is a release sheet placed between groups of heat and pressure consolidated laminae pressed at the same time in back-to-back configuration to form two distinct decorative laminates. The release sheet in this case separates the laminates from each other and thereby permits more than one to be pressed at the same time between the same platens. (See, for example, U.S. Pat. No. 4,030,955 to Antonio et al.)

Release sheets are typically produced by coating, treating, or impregnating a paper web or other sheet-like substrate with a release coating of such materials as polymethylpentene, polypropylene, polyfluorocarbons, silicone oil, thermoset silicone resins, and other conventional release agents. Usually, release papers comprise a base sheet provided with at least one first coating, conventionally referred to as a base coating, and a release coating overlying the base coating. The base coating typically comprises a pigment or filler, such as a paper coating grade clay together with an adhesive binder. The purpose of the base coating is to level and seal the surface. The pigment in the coating provides a smooth surface by masking the irregularities in the surface of the base sheet, and the adhesive binds the pigment and prevents undue penetration into the base sheet by the subsequently applied release coating. The base coating thereby maximizes the effectiveness of the release coating applied by preventing penetration of the release coating into the body-stock.

Surface effects on the release sheet, when desired, are conventionally provided by any one of a number of techniques. The release coating can be dried to a smooth surface gloss or surface effects such as texturing or embossing can be provided in the coating by mechanical means, applied either to the surface of the base paper before coating or to the paper after the release coating is applied. Another technique employed for producing a release coating with a textured surface is to extrude a molten thermoplastic film, such as polypropylene or polymethylpentene, onto a paper surface, cool it and then pass it between matched steel embossing rolls.

DISCLOSURE OF THE INVENTION

In accordance with the present invention, a release coating is provided by a coating composition having an acrylic functional component which has been polymerized by electron beam radiation. The present invention is also an improvement in a method of forming a plastic sheet or film on or against an easy release surface, setting the plastic sheet or film, and stripping it from the release surface. The improvement is the release surface being provided by a substrate coated on at least one side with a coating composition comprising an acrylic functional material which has been polymerized by electron beam radiation. Surprisingly, the invention provides a coating having excellent release properties without need for conventional release agents such as polysiloxanes (thermoset silicone resins). Accordingly, one embodiment of the invention employs a non-polysiloxane containing coating. In another embodiment of the invention, the coating composition employs an acrylic functional material, some of which has only one acrylic functional group per molecule and some of which has three or more groups per molecule before polymerization. In this latter embodiment of the invention, the coating composition can also contain conventional release agents, such as polysiloxanes, but they are not needed to permit satisfactory release.

The term "forming" is used herein in a broad sense and includes the actual formation of a plastic sheet or film from a flowable state as well as the pressing of a moldable, already-existing plastic sheet or film. In some embodiments, the plastic sheet or film is provided by a polyvinyl chloride plastisol or polyurethane which is cast onto the release surface in a flowable state and set to provide a surface effect which is the reverse of the release surface. In other embodiments, the plastic sheet or film is provided by an outermost lamina in a heat and pressure consolidated decorative laminate which is pressed against the release surface. Where the lamina pressed against the release surface is the decor sheet, or overlay sheet if one is used, the surface of the decor sheet or overlay sheet will be molded during consolidation to have a surface effect which is the reverse of the release surface. Where the lamina pressed against the release surface is the back most lamina which will later be glued to a reinforcing substrate, the release surface substrate is coated on both sides with the release coating composition and is an interleaver separating two groups of laminae consolidated in back-to-back configuration.

The invention is also a composite comprising a sheet-like substrate, a coating on at least one side of the substrate of a coating composition comprising an acrylic functional material which has been polymerized by electron beam radiation to provide a release surface, and on top of the release surface, a strippable sheet or film. The coating composition in one embodiment contains no polysiloxanes and in another embodiment some of the acrylic functional material has one acrylic functional group per molecule and some has three or more acrylic functional groups before polymerization. The substrate is preferably provided by paper coated with a base coat to reduce penetration of the release surface coating into the paper substrate. The strippable sheet or film can be provided by, for example, cast and set films of such materials as polyvinyl chloride and polyurethane, one or more laminae in a consolidated decorative laminate, or the transferable film in a heat transferable printed design. Such composites can be sold intact for later uses which require stripping of the sheet or film from the release surface.

The polymerization energy is provided by conventional electron beam radiation units readily available. They typically consist of a transformer capable of stepping up line voltage and an electron accelerator. In one type of machine the electrons are generated from a point source filament and then scanned electromagnetically like a television set to traverse the coated object. In another type of machine, the electrons are generated in a curtain from an extended filament which can irradiate the entire width of the surface without the need for scanning. While commercial machines are available with accelerating voltages of over a million electron volts, the range for this and similar coating applications is typically from 150–300 KV (kiloelectron volts).

The coating applied to the paper must be capable of being cured by electron beam radiation, and the polymerization energy for the release coating must be provided by electron beam radiation. It is the combination of the acrylic functional material and the electron beam radiation which surprisingly provides the release properties of the invention. Coatings of this type may be polymerized by a variety of other means, such as heat, catalyst and UV radiation, but only electron beam radiation will satisfactorily provide the release properties of the invention. On the other hand, acrylates are the primary group of polymerizable materials which has a fast enough cure rate to be able to use beneficially the high energy of electron beam radiation. Electron beam radiation energy level per electron is much greater than the energy level of, for example, a photon of UV radiation, and electron beams can readily penetrate into and cure a thick coating.

The major component of electron-beam curable formulas suitable for the invention is an acrylic functional oligimer or monomer. By acrylic functional it is meant that the material includes acrylic groups which are capable of entering into a polymerization reaction. The acrylic functional material can have one or more acrylic functional groups per molecule before polymerization. Multifunctionality, such as two or more acrylic functional groups per molecule is highly desirable for at least some of the material, since the polymerized coating will have greater cross-linking density, and therefore, greater inertness to the sheets or films, and in some cases their solvents, formed on or against them. However, an excessive amount of material with a large number of acrylic functional groups per molecule can result in too much shrinking of the coating upon polymerization, as well as cracking, brittleness and curl. In addition, the coating material can become too viscous to coat conveniently. Therefore, it is preferable to include some material with only one acrylic functional group per molecule when some of the material has three or more acrylic functional groups per molecule. Such preferred coatings can also contain some material with two acrylic functional groups per molecule along with the material having one functional group and the material having three or more functional groups before polymerization.

The coating composition can include materials other than the acrylic functional material. For example, viscosity control additives, such as colloidal silica or volatile solvents, or surface texture materials, such as starch grains or silica, might be included. In addition, filler material such as conventional paper coating pigments can be included to reduce costs of the coating. However, the amount of acrylic functional material in the coating composition must be sufficient to provide a continuous, hard, polymerized layer in the areas where it is coated. It is preferable that the acrylic functional material provide at least about 30% by weight of the total coating composition, and more preferable that it provide at least about 40%. Conventional release agents, such as polysiloxanes, can also be added and in some cases will further enhance release, but they are not needed to provide adequate release and it is preferable in most cases to avoid their additional cost and their disadvantage of permitting transfer of part of their material to the formed sheet or film.

The release coating composition can be coated on a variety of sheet-like substrates, such as paper, metal foils, and plastic films. It is highly desirable that the substrate be generally impervious to penetration of the release coating composition to provide a hold-up function which maximizes efficiency of the coating composition. The substrate is preferably paper with a base coat to prevent penetration of the release coating composition. Paper is highly desirable because of its low cost, flexibility and other physical properties.

BEST MODE FOR CARRYING OUT THE INVENTION

The following examples illustrate the invention.

Example 1

A paper base sheet of hardwood and softwood fibers and having a basis weight of 121 grams per square meter (82 lbs. per ream of 3,300 sq. ft.) was selected as the starting material for the substrate. The base sheet was first base coated with adhesive/pigment coatings to provide a total substrate weight of about 154 grams per square meter (104 lbs. per ream.) The base coatings imparted resistance to penetration of the subsequently applied release coating.

A release coating of the present invention was applied by a meyer rod over the base coated substrate in an amount sufficient to provide a continuous, uniform layer. The release coating was a mixture of the following, obtained from Sun Chemical Co. as Suncure GA-1293:

| | |
|---|---|
| A monomeric polyacrylate with three acrylic groups per molecule, mol. wt. 500–600 | 56 parts by weight |
| Brominated polyester | 20 parts by weight |
| Epoxy acrylate | 10 parts by weight |
| An amine initiator, viscosity reducer (hexadecylalcohol) and anti-slip agents | 14 parts by weight |

The coated samples were cured or polymerized to a dry, hard state with a dose of 3 megarads of electron beam radiation by passing the coated paper at 30.5 meters per minute (100 fpm.) under an electron beam apparatus operating at 170 KV. The coating was cured in a nitrogen atmosphere.

Samples of the coated substrate were tested for various casting and panel pressing release applications as follows. In all cases the plastic sheet or film formed on or against the release surface of Example 1 released satisfactorily and produced a surface effect in the sheet or film which was the reverse of the surface effect on the release surface.

A. Vinyl Casting

A polyvinyl chloride plastisol was cast onto the cured surface using a Gardner metering knife to set down a wet film of one millimeter thickness. The plastisol was dried for two minutes at 100° C. and cured for 2 minutes at 190° C. Following this, the cast film was stripped from the radiation cured surface. The energy required to strip the film was measured by an Osgood-Sutermeister release tester, which provides a comparative measurement of the energy required to strip a sample of the cured film 3.8 cm. × 7.7 cm. from the release paper. A satisfactory value for vinyl film is 70 Joules per square meter or less. The release paper of Example 1 gave a reading of 7 Joules per square meter.

B. Urethane Casting

A film forming solution of polyurethane in a 1:1 mixture of isopropyl alcohol and toluene was cast upon the cured release surface of Example 1 using a meyer rod, dried and cured. The film was then stripped from the release surface in the Osgood-Sutermeister tester and found to strip satisfactorily as a self-supporting film with stripping energy of 64 Joules per square meter, a value considered satisfactory for urethanes.

C. Panel Pressing

The release paper of Example 1 was tested and found satisfactory for use in the preparation of polyester and melamine panels, both high and low pressure.

i. Low Pressure Melamine Panels. Over a 19 mm. (¾ inch) thick particle board (used as a base to impart strength and rigidity to the panel) was placed a porous decorative paper saturated with a partially cured melamine resin, commonly referred to in the trade as a melamine "prepreg". The release paper of Example 1 was placed over the prepreg with its release surface in contact with the prepreg, and the particle board, prepreg, and release paper were all placed between platens, and pressed at 23.6 Kg./cm.$^2$ (335 psi.) and 160° C. for 1½ minutes. Upon removal from the press the release paper exhibited excellent release from the pressed panel. A rating of "easy" release was given to the release surface.

ii. High Pressure Melamine Panels. The release paper of Example 1 was placed over a composite for a high pressure consolidated decorative laminate. The composite consisted of three kraft sheets saturated with phenolic resin and a melamine-saturated, solid white decor sheet. The release paper of Example 1 was placed over the decor sheet and the total composite was placed between platens in a cold press. The laminate was consolidated at 84.5 Kg./cm.$^2$ (1200 psi) and 149° C. for 24 minutes, after which the press was allowed to cool and the composite was removed. The release paper stripped cleanly from the laminate, and a rating of "easy" release was given to the release surface.

iii. Polyester Panels. The release paper of Example 1 was superimposed over the surface of a polyester decorative prepreg on a 19 mm. (¾ inch) thick particle board. This sandwich with the release paper in contact therewith was placed in a press at 14 Kg./cm.² (200 psi.) and at a temperature of 230° C. for 8 minutes. The laminated panel was then removed from the press, and the release paper was stripped away to leave a clean panel surface. While release in this example was rated "tight", it was nevertheless satisfactory in all respects.

EXAMPLES 2–39

A paper substrate having an uncoated basis weight of about 89–104 grams per square meter (60–70 lbs. per ream) and a 15 grams per square meter (10 lbs. per ream) base coat of a conventional pigment/adhesive dispersion was top coated with the coating compositions described below. The coatings were polymerized with electron beam radiation at the line speeds (in meters per minute) and dosages listed below. In the examples, the coatings polymerized satisfactorily to a dry hard state and were tested for release properties by casting a film of polyurethane resin onto the release surface, drying for 1½ minutes at 100° C. in a non-circulating air oven and curing for 1½ minutes at 160° C. in an air circulating oven to form a 25.4 microns (1 mil) thick film. The film in each example was stripped from the release surface in an Osgood-Sutermeister release tester and found to strip satisfactorily with the surface effect of the release surface replicated in reverse in the film. Cast polyurethane films tend to adhere very tightly to release surfaces, and stripping energy requirements below 70 Joules per square meter indicates that the surface is suitable for urethane release. However, the preferable standard for a good urethane release surface is a stripping energy less than 47 Joules per square meter. Although these examples were not tested for release of cast vinyl films, it is generally accepted that a release surface that is satisfactory for cast urethane films will be satisfactory for releasing cast vinyl films and will generally release them with less force than the urethane films. The polyurethanes tested for release were: (1) UIK urethane, a dispersion of urethane in dimethyl formamide, supplied by Custom Chemicals, and (2) Impranil D-353-a 35% solids dispersion of urethane in dimethyl formamide, supplied by Verona Dyestuff Div. of Mobay Chemical Corp.

The coating materials employed in the examples are listed below and designated by letters. The materials were mixed in the ratios indicated, by weight.

| Material Designation | Material Description |
|---|---|
| A | Oligimer, a half-ester type of hydroxyalkyl acrylate-anhydride epoxide, containing 35% hydroxypropyl acrylate, Dow Chemical XD-7531.01. (two acrylic functional groups per molecule) |
| B | Oligimer, a vinyl-ester resin of Bisphenol A-glycidyl acrylate, Dow Chemical XD-8008.04. (two acrylic functional groups per molecule) |
| C | Oligimer, a neat diacrylate vinyl-ester resin, based on the addition reaction of an epoxy resin with the half ester of a hydroxy-alkyl acrylate and an anhydride, Dow Chemical XD-8036.02. (two acrylic functional groups per molecule) |
| D | Oligimer, an aliphatic Bisphenol A-diepoxide diacrylate of medium molecular weight, Dow Chemical XD-9016. (two acrylic functional groups per molecule) |
| E | Acrylic monomer, 1, 6-hexanediol diacrylate. (two acrylic functional groups per molecule) |
| F | Acrylic monomer, 2-ethylhexylacrylate (one acrylic functional group per molecule) |
| G | Acrylic monomer, butyl acrylate. (one acrylic functional group per molecule) |
| H | Acrylic monomer, trimethylolpropane triacrylate. (three acrylic functional groups per molecule) |
| I | Acrylic monomer, neopentylglycol diacrylate. (two acrylic functional groups per molecule) |
| J | Acrylic monomer, ethylacrylate. (one acrylic functional group per molecule) |
| K | Acrylic monomer, tetraethyleneglycol diacrylate. (two acrylic functional groups per molecule) |
| L | Acrylic monomer, phenoxyethylacrylate. (one acrylic functional group per molecule) |
| M | Acrylic monomer, isodecylacrylate. (one acrylic functional group per molecule) |
| N | Polymer, poly(n-butylmethacrylate), (Du Pont Elvacite 2044), a linear thermoplastic polymer for viscosity. |
| O | Pigment, calcined diatomaceous earth (silicon dioxide), Johns-Manville Celite 263. |
| P | Pigment, coarse-ground calcium carbonate, Thompson-Wyman Atomite. |
| Q | Pigment, fumed silica, W. R. Grace Syloid 166. |

| Example No. | Coating Composition | Ratio of Components | Radiation Dose (megarads) | Line Speed (mpm) | Release Force (J/M²) (1) | Release Force (J/M²) (2) |
|---|---|---|---|---|---|---|
| 2 | A/E | 2:1 | 6 | 3.4 | 48.2 | |
| 3 | A/E | 1:1 | 6 | 3.4 | 30.8 | |
| 4 | B/E | 1:1 | 6 | 3.4 | 38.1 | |
| 5 | B/E | 1:1 | 3 | 6.7 | 28.4 | 39.9 |
| 6 | B/F/E | 1:1:1 | 6 | 3.4 | 36.3 | 55 |
| 7 | E | — | 6 | 3.4 | 26.3 | |
| 8 | C/E | 1:1 | 6 | 3.4 | 25.2 | 45.2 |
| 9 | C/O | 95:15 | 6 | 3.4 | | 39.5 |
| 10 | C/G | 7:3 | 12 | 3.4 | | 33.9 |
| 11 | E/H | 4:1 | 6 | 3.4 | | 17 |
| 12 | G/I | 1:1 | 6 | 3.4 | | 9.9 |
| 13 | E/H/G | 4:1:5 | 6 | 3.4 | | 6.9 |
| 14 | E/H/G | 4:1:5 | 5 | 12.8 | | 25.7 |
| 15 | E/H/G | 4:1:5 | 4 | 12.8 | | 31.6 |
| 16 | E/H/G | 4:1:5 | 3 | 12.8 | | 46.8 |
| 17 | G/E/H/N | 10:8:2:1 | 3 | 14.1 | | 50.3 |
| 18 | G/E/H/N | 10:8:2:1 | 6 | 14.1 | | 35.1 |
| 19 | G/E/N | 10:10:1 | 6 | 14.1 | | 25.7 |
| 20 | J/E/H/N | 10:8:2:1 | 3 | 14.1 | | 58.5 |
| 21 | J/E/H/N | 10:8:2:1 | 6 | 14.1 | | 52.6 |
| 22 | J/E/N | 10:10:1 | 3 | 14.1 | | 52.6 |
| 23 | J/E/N | 10:10:1 | 6 | 14.1 | | 64.4 |
| 24 | G/I/H/N | 10:8:2:1 | 3 | 14.1 | | 21.5 |
| 25 | G/I/H/N | 10:8:2:1 | 6 | 14.1 | | 18.7 |
| 26 | H/I | 1:1 | 5 | 14.1 | | 28.3 |
| 27 | K | — | 5 | 14.1 | | 30.5 |
| 28 | H/E/L | 1:4:10 | 6 | 3.7 | | 23.4 |
| 29 | H/L/D | 1:2:2 | 8 | 3.7 | | 23.4 |
| 30 | D/I | 5:2 | 6–8 | 3.7 | | 23.4 |
| 31 | H/M/E | 1:5:4 | 6–8 | 3.7 | less than | 11.7 |
| 32 | H/M/L | 2:5:5 | 6 | 3.7 | | 17.6 |
| 33 | H/M/L/P | 2:5:5:5 | 6 | 3.7 | | 17.6 |
| 34 | H/M/L/P | 2:5:5:10 | 6 | 3.7 | | 23.4 |
| 35 | H/M/D/L | 2:5:5:5 | 8 | 3.7 | | 11.7 |
| 36 | H/M/D/L/P | 2:5:5:5:9 | 6 | 3.7 | | 29.3 |
| 37 | H/M/D/L/P | 2:5:5:5:17 | 6 | 3.7 | | 26.9 |
| 38 | H/L/P | 2:4:5 | 6 | 3.7 | | 11.7 |
| 39 | H/L/P/Q | 4:8:5:1 | 6 | 3.7 | | 17.6 |

What is claimed is:
1. In a method of forming a plastic sheet or film on or against an easy release surface, setting the plastic sheet or film and stripping it from the release surface, the improvement wherein the release surface is provided by a substrate coated on at least one side with a non-polysiloxane containing coating composition comprising an acrylic functional material which has been polymerized on the substrate by electron beam radiation.

2. In a method of forming a plastic sheet or film on or against an easy release surface, setting the plastic sheet or film and stripping it from the release surface, the improvement wherein the release surface is provided by a substrate coated on at least one side with a coating composition comprising an acrylic functional material which has been polymerized on the substrate by electron beam radiation, some of the acrylic functional material having one acrylic group and some having three or more acrylic groups per molecule before polymerization.

3. The method of either claim 1 or claim 2, wherein the plastic sheet or film is cast onto the release surface in a flowable state.

4. The method of claim 3, wherein the plastic sheet or film is polyurethane.

5. The method of claim 3, wherein the plastic sheet or film is polyvinyl chloride plastisol.

6. The method of either claim 1 or claim 2, wherein the plastic sheet or film is one lamina in a decorative heat and pressure consolidated decorative laminate and is pressed against the release surface during consolidation of the laminate.

7. The method of claim 6, wherein the plastic sheet or film pressed against the surface is the decor sheet or overlay sheet, and the release sheet forms a surface effect in the decor sheet or overlay.

8. The method of claim 6, wherein the plastic sheet or film pressed against the release sheet is the back most lamina which will later be glued to a reinforcing substrate, and the release surface substrate is coated on both sides with the coating composition and is an interleaver separating two groups of laminae consolidated in back-to-back configuration.

9. The method of either claim 1 or claim 2, wherein the acrylic functional material provides at least 30% by weight of the coating composition.

10. The method of claim 9, wherein the acrylic functional material provides at least 40% by weight of the coating composition.

11. The method of claim 1, wherein at least some of the acrylic functional material has two or more acrylic groups per molecule before polymerization.

12. The method of claim 1, wherein some of the acrylic functional material has one acrylic group and some has three or more acrylic groups per molecule before polymerization.

13. The method of claim 12, wherein some of the acrylic functional material has two acrylic groups per molecule before polymerization.

14. The method of claim 2, wherein some of the acrylic functional material has two acrylic groups per molecule before polymerization.

15. A composite comprising a sheet-like substrate, a coating on at least one side of the substrate of a non-polysiloxane coating composition comprising an acrylic functional material which has been polymerized on the substrate by electron beam radiation to provide a release surface, and on top of the release surface, a strippable sheet or film.

16. A composite comprising a sheet-like substrate, a coating on at least one side of the substrate of a coating composition comprising an acrylic functional material which has been polymerized on the substrate by electron beam radiation to provide a release surface, and on top of the release surface, a strippable sheet or film, some of the acrylic functional material having one acrylic group and some having three or more acrylic groups per molecule before polymerization.

17. The composite of either claim 15 or claim 16, wherein the sheet-like substrate is paper and further including between the substrate and release surface a base coat to reduce penetration of the release surface coating into the paper substrate.

18. The composite of claim 16, wherein the coating composition does not contain polysiloxane.

* * * * *